(No Model.)
R. S. WARING.
ELECTRIC CABLE.
No. 252,634. Patented Jan. 24, 1882.
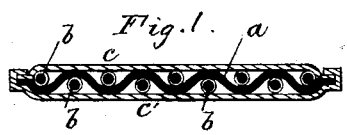
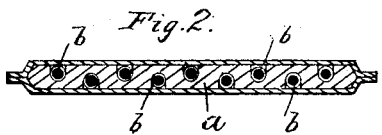
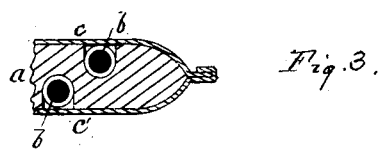
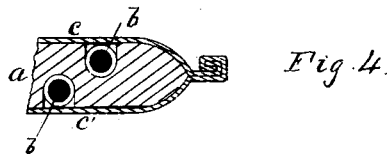
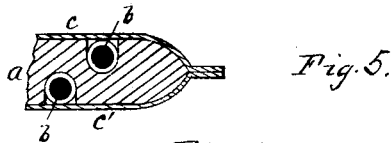
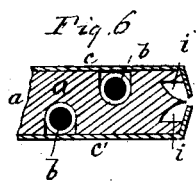
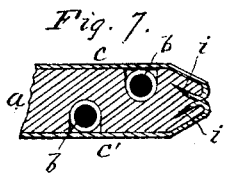
WITNESSES:
G. Smith.
T. J. Patterson.
Richard S. Waring, INVENTOR,
Connolly Bros & McTighe,
ATTORNEYS.

UNITED STATES PATENT OFFICE.

RICHARD S. WARING, OF PITTSBURG, PENNSYLVANIA.

ELECTRIC CABLE.

SPECIFICATION forming part of Letters Patent No. 252,634, dated January 24, 1882.

Application filed October 3, 1881. (No model.)

*To all whom it may concern:*

Be it known that I, RICHARD S. WARING, of Pittsburg, in the county of Allegheny and State of Pennsylvania, have invented certain new and useful Improvements in Electric Cables; and I do hereby declare that the following is a full, clear, and exact description of the invention, which will enable others skilled in the art to which it appertains to make and use the same, reference being had to the accompanying drawings, which form a part of this specification, in which—

Figure 1 represents one form of my invention in section. Fig. 2 represents another in section. Figs. 3, 4, 5, 6, and 7 are modifications.

This invention has reference to the manufacture of electrical cables comprising a number of insulated wires protected by a covering of flexible metal.

The invention consists in longitudinally grooving or corrugating a strip of flexible metal, preferably lead, the corrugations or grooves being successively on both faces of the strip, then placing insulated wires in the grooves, next inclosing the said strip and wires between two flat strips, and finally consolidating or uniting the edges, as hereinafter fully described.

In Fig. 1 the strip *a* is longitudinally corrugated both ways, forming troughs for the wires *b* on both faces. The insulated wires *b* are applied as shown, after which the flat strip *c*, of lead, is placed above and the flat strip *c'* below, and the whole united in any of the following ways: They may be bent down over the beveled edges of strip *a*, as in Fig. 2, or rounded edges, as in Fig. 5, and soldered with flexible solder, face to face; or the strips *c* may be formed to come together, as in Figs. 1 and 3, and then passed between skelping or beading dies or rolls, and thus molded into the single seam shown; or the strips *c* may be in like manner double seamed, as in Fig. 4; or the strip *a* may be formed with grooves *i* on its edges, into which grooves the strips *c* may be folded, as in Fig. 6, and then compressed into the form shown at Fig. 7. All the above forms are practically water-tight; but the application of a soft flexible solder insures an effective union.

Any of the forms may be integrally united after the manner described in Letters Patent No. 246,407, to which reference is hereby made.

As any of the above forms of molding or shaping can be produced quite readily by mechanical means, and to a great extent automatically and continuously, the finished product may be turned out with exceeding cheapness and facility in any desired lengths.

Any of the above forms insures an unbroken and continuous wall of metal between each wire and its neighbors.

I claim as my invention—

The method of manufacturing electrical cables, consisting in first taking a strip of flexible metal having longitudinal grooves successively on opposite faces of the strip, placing insulated wires in said grooves, then inclosing the whole between two wider strips of lead, and uniting the edges of same, substantially as described.

In testimony that I claim the foregoing as my own I have hereto affixed my signature in presence of two witnesses.

RICHARD S. WARING.

Witnesses:
T. J. McTIGHE,
T. J. PATTERSON.